Sept. 10, 1968    T. G. LAWSON ETAL    3,400,986
HYDRAULIC BRAKE CONTROL VALVES

Filed April 3, 1967    2 Sheets-Sheet 1

United States Patent Office 3,400,986
Patented Sept. 10, 1968

3,400,986
HYDRAULIC BRAKE CONTROL VALVES
Thomas G. Lawson and Robert J. Cummings, Tyseley, Birmingham, England, assignors to Girling Limited, Tyseley, Birmingham, England, a British company
Filed Apr. 3, 1967, Ser. No. 627,875
Claims priority, application Great Britain, Apr. 7, 1966, 15,581/66
5 Claims. (Cl. 303—6)

ABSTRACT OF THE DISCLOSURE

In a pressure regulating valve for hydraulic brake systems of the type in which communication between the inlet and outlet is controlled by piston-actuated internal valve means, production is facilitated by providing two separate pistons of different diameter in place of the known stepped piston. The pistons are mechanically coupled externally of the valve body for transmitting thrust between them. The internal valve may comprise a seat fixed between the two pistons, one of which controls the position of a valve member which co-operates with the seat.

---

Figure 1:
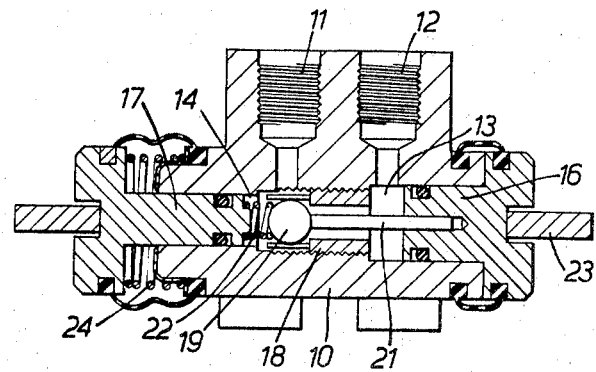

In fluid operated braking systems for vehicles, it is frequently desired to arrange for the braking pressure applied at one or more vehicle wheels to increase at a different rate from that at which the master cylinder pressure increases. For example, in a four wheeled road vehicle, it may be desired to arrange for the pressure at the rear brakes to increase at a reduced rate, relative to the master cylinder pressure, after a predetermined pressure (commonly known as the cut-off pressure) has been developed in the master cylinder, in order to take account of weight transfer from the rear of the vehicle to the front during braking and thereby reduce the risk of the rear wheels skidding. Alternatively, it may be desired to increase the rate of increase of pressure at selected wheel brakes, relative to the rate of increase of the master cylinder pressure.

The differential rate of pressure increase is usually achieved by the use of a brake control valve, the valve member of which is subjected, through the intermediary of control spring means, to a force which varies according to the loading of the vehicle, which thereby determines the cut-off pressure.

One form of control valve for this purpose is described in the specification of British Patent No. 994,812. This valve is perfectly satisfactory in operation, but suffers from the disadvantage that its production is complicated by the requirement of a stepped piston. With such a construction, the machining of the two piston bores of different diameter, and of the stepped piston itself, is critical, since co-axiality of the two bores and of the two portions of the piston is critical for satisfactory results to be obtained.

The present invention provides an alternative form of control valve, of novel design aimed at simplifying manufacture of the valve.

In accordance with the invention, there is provided an hydraulic brake pressure control valve comprising a body having two bores of different diameter, an inlet communicating with one bore and an outlet with the other, a piston in each bore, an internal valve controlling communication between the two bores and closable in response to movement of one of the pistons relative to the body, and means outside the body for transmitting thrust between the two pistons.

The internal valve preferably comprises a valve seat which is fixed to the body, and a valve member, such as a valve ball, which is normally held off the valve seat but which closes against the valve seat upon displacement of one of the pistons.

The two bores are preferably arranged substantially co-axially, each of the pistons projecting at its outer end through an adjacent end of the valve body, and the pistons are coupled together by a yoke engaging over both end portions in order to limit axial separation thereof.

With these arrangements, the alignment of the two piston bores is not critical, and manufacture of the pistons is simplified since each can take the form of a plain piston.

Figure 2:
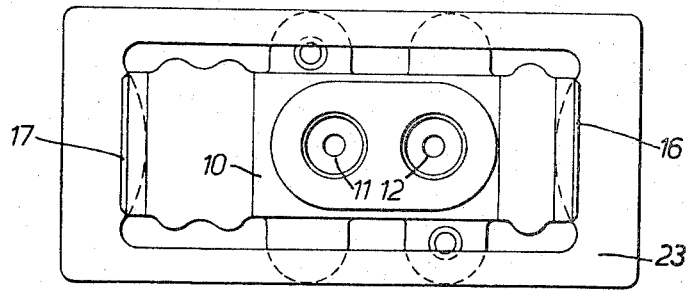
Figure 3:
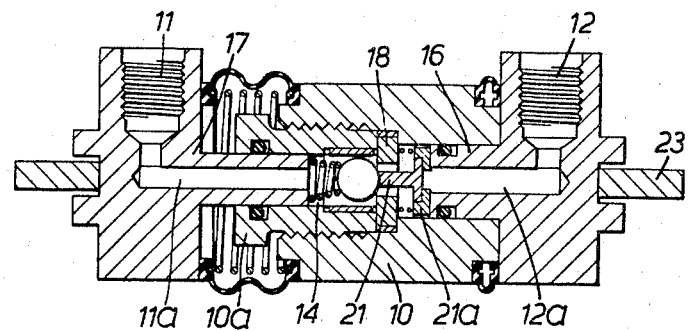
Figure 4:
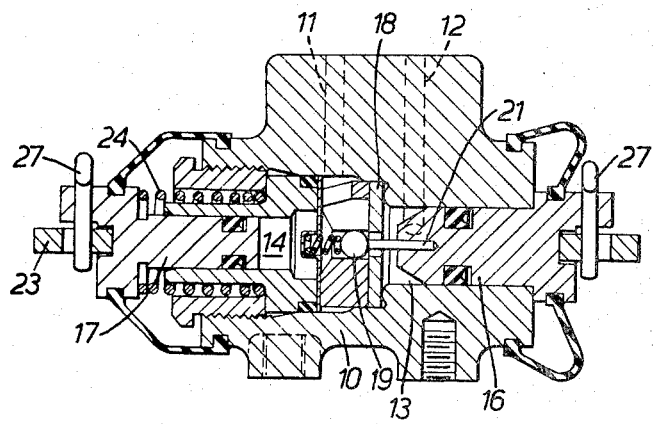

Some constructional forms of the invention will now be described, by way of example only, with reference to the accompanying drawings, in which:

FIGURE 1 is a sectional elevation of one form of control valve;
FIGURE 2 is a plan view of the valve of FIGURE 1;
FIGURE 3 is a sectional elevation of a second form of control valve; and
FIGURE 4 is a sectional elevation of a third form of control valve.

The valve shown in FIGURES 1 and 2 comprises a body 10 having an inlet 11 and an outlet 12, and is formed with two substantially co-axial piston bores 13 and 14 in which are disposed a large piston 16 and a small piston 17, respectively, the larger diameter bore 13 and piston 16 being in communication with the outlet 12, and the other bore and piston with the inlet 11. Secured in the body between the piston bores 13 and 14 is an annular insert 18 which provides a valve seat for a valve ball 19 normally engaged and held off its seat by a pin 21 secured to the large piston 16. The valve ball 19 is guided by a number (say four) of fingers which project axially from the adjacent end of the insert 18, and the ball is urged towards the valve seat by a light coil spring 22 abutting the small piston 17.

Externally of the body, the outwardly projecting end portions of the pistons 16 and 17 are coupled together by an annular strap 23 which surrounds the body and limits the axial separation of the pistons to that illustrated in FIGURE 1. A coil compression spring 24 acting between the body and a head formed on the piston 17 urges the assembly of the two pistons and the strap 23 to the extreme left hand position shown in FIGURE 1. Additionally, this assembly is subjected in use to a load from an external valve control spring (not shown) acting on the strap 23 and urging it to the left in FIGURE 1.

The valve is thus shown in its normally unoperated condition in FIGURE 1. In use, with the inlet 11 connected to a brake master cylinder and the outlet 12 connected to the slave cylinder of one set of brakes, say the rear brakes, an initial increase in master cylinder pressure will result in a flow of fluid through the inlet 11, past the valve ball 19 to the outlet 12. When the master cylinder pressure reaches a predetermined level, i.e. cut-off pressure, the pressure on the large piston overcomes the forces exerted on the movable assembly by the external control spring, the spring 22, and the pressure acting on the small piston, so that the large piston 16 is moved outwardly (to the right), drawing the small piston 17 inwardly. The valve ball 19 is thus permitted to close against the valve seat 18 to isolate the outlet 12 from the inlet 11. A further increase in master cylinder pressure acts only upon the small piston 17, which therefore moves outwardly (to the left) to force the large piston 16 inwardly, thereby unseating the valve ball 19. Some further increase in pressure therefore occurs in the outlet 12, until the increased pressure on the large piston again becomes dominant and the large piston moves outwardly to allow the valve ball to close again. This opening and closing of the internal valve occurs repeatedly during a brake application and results in a rise of pressure in the outlet 12 at a lower rate than in the inlet 11.

The cut-off pressure is dictated by the external load exerated by the control spring, which in turn is loaded according to the position of the vehicle frame relative to the rear axle and therefore takes account of weight transfer.

When the brake pedal is released, the pressure in the inlet 11 falls, and the pressure in the outlet 12 causes the valve ball 19 to be unseated, thereby permitting flow of fluid back to the inlet and thus to the master cylinder.

The control valve illustrated in FIGURE 3 is similar in construction and operation to that of FIGURES 1 and 2, but in this case the interconnected pistons are adapted to be mounted fixedly upon a vehicle frame and it is the body 10 which is caused to move. The smaller bore 14 of the body is formed in a plug 10a screwed into the body, clamping the annular insert 18 in position. The inlet 11 and outlet 12 are formed in the bodies of the pistons 16 and 17, which have axial passages 12a and 11a, respectively, communicating with the outlet and inlet. The valve ball 19 is now engaged by a pin 21 which is integral at one end with radial ribs 21a engaging the inner end of the large piston 16. The valve ball is guided within a slotted insert, the slots allowing fluid flow paths of an adequate size.

Externally, the body is formed with a cast lug (not shown) on opposite sides of the body, each lug having a curved face for engagement with a lever member in turn engageable by an external control spring.

Apart from the fact that it is the body which moves instead of the pistons, the operation of this valve is as described in relation to the valve of FIGURES 1 and 2.

The valve shown in FIGURE 4 is generally similar to that of FIGURES 1 and 2, but varies in some of its constructional details. The smaller piston 17 works in a sleeve 10A secured in the body 10 by a threaded bush 10B. The spring 22 locates in a cup formed in a perforated plate 26. The pistons 16 and 17 are each coupled to the yoke 23 by means of a split pin 27 received in an elongated hole in the yoke.

In another modified form of the control valve, not illustrated, the piston bores are not co-axial but are arranged in parallel with each other and the pistons are formed with stems which are interconnected with a lever pivoted intermediate its ends about a fixed point. The external control spring acts on the stem of the larger piston and the operation of the valve is essentially the same as that described above.

We claim:
1. In an hydraulic brake pressure control valve comprising a body having two bores of different diameter, an inlet communicating with one of the said bores and an outlet communicating with the other of said bores, and internal valve means controlling communication between said bores, the improvement comprising:
  two separate pistons, one in each of said bores;
  means associated with one of said pistons normally holding said internal valve means in open position, said valve means being closable in response to movement of one of said pistons relative to said body;
  and mechanical connecting means mounted externally of said body and arranged to transmit thrust between said pistons.

2. Control valve as claimed in claim 1, wherein said internal valve means comprises a valve seat fixedly mounted in said body and a valve member co-operable with said seat.

3. Control valve as claimed in claim 1, wherein said bores are substantially co-axial, and said internal valve means comprise a valve seat fixedly mounted in said body between said pistons, a movable valve member arranged for co-operation with said valve seat and resilient means urging said valve member to close against said seat.

4. Control valve as claimed in claim 3, wherein each said piston has an outer end portion projecting through an adjacent end of said body, and said mechanical connecting means comprises a yoke engaging over both said end portions to limit axial separation of said pistons.

5. An hydraulic brake pressure control valve comprising a body, means defining two substantially co-axial bores in said body, means defining an inlet in said body communicating with one of said bores, means defining an outlet in said body communicating with the other of said bores, a first piston extending through one end of said body into the smaller of said bores, a second piston extending through an opposite end of said body into the larger of said bores, a yoke surrounding said body and engaging both said pistons to limit axial separation thereof, spring means acting between said body and one of said pistons to urge said pistons and said yoke to a normal extreme position relative to said body, a valve seat fixedly mounted in said body between said pistons, a valve member for co-operation with said valve seat, resilient means urging said valve member into sealing engagement with said seat, and means associated with said second piston extending through said valve seat to engage said valve member, said means holding said valve member off said seat when said pistons and yoke are in said normal extreme position, and movement of said second piston away from said position in response to an increase in hydraulic pressure in said outlet being effective to allow said valve member to close against said seat under the action of said resilient means.

References Cited

UNITED STATES PATENTS 2,613,683  10/1952  Baird et al. _____ 137—493 X
2,818,138  12/1957  Ostwald et al. _____ 137—493 X

FOREIGN PATENTS 1,388,421  4/1964  France.

MILTON BUCHLER, *Primary Examiner.*

J. McLAUGHLIN, *Assistant Examiner.*